Jan. 2, 1940.                J. J. BLACK                 2,185,961
              TRUCK OR TRAILER FRONT CONSTRUCTION
                        Filed May 6, 1938
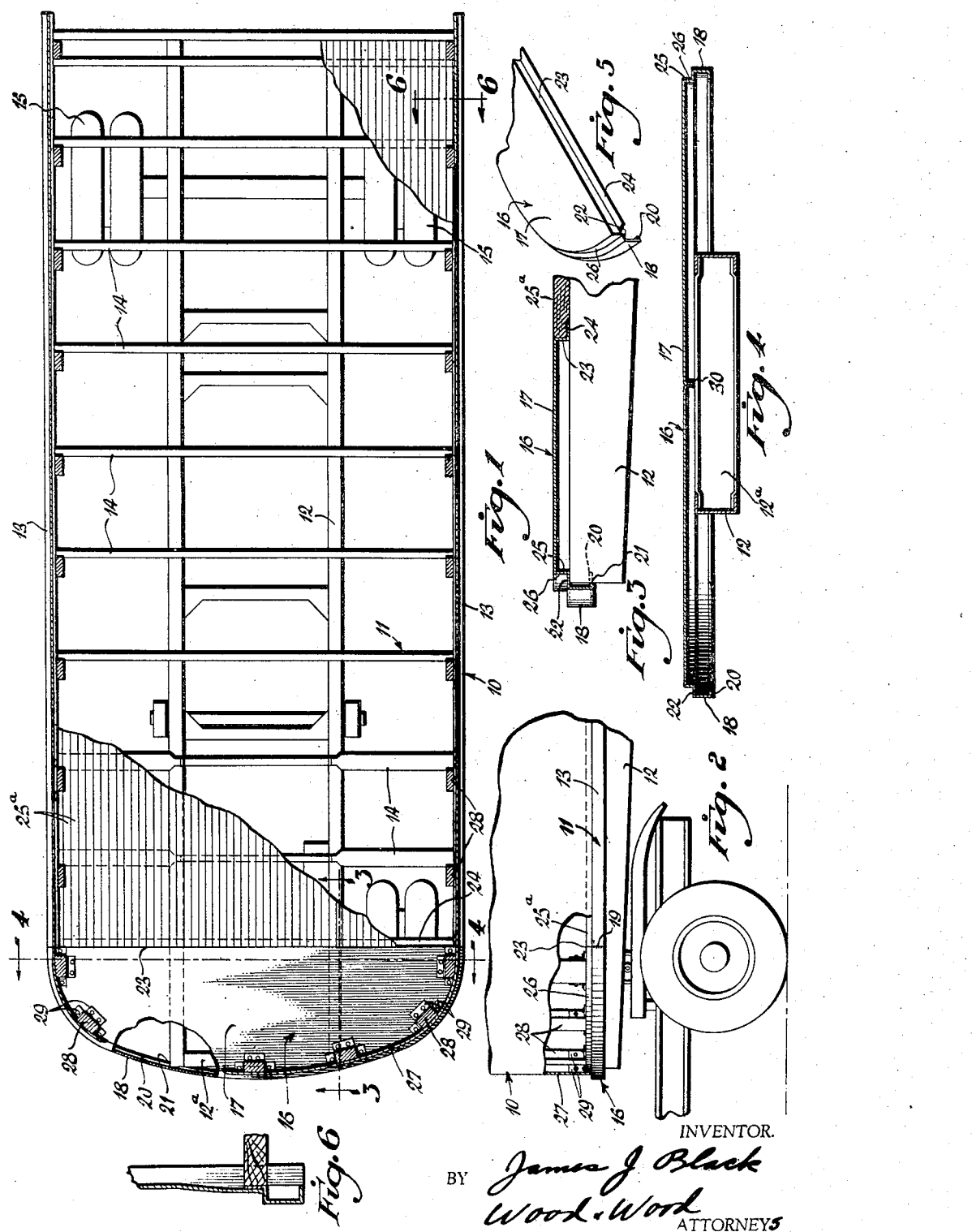
INVENTOR.
BY James J. Black
Wood & Wood
ATTORNEYS Patented Jan. 2, 1940

2,185,961

UNITED STATES PATENT OFFICE 2,185,961

TRUCK OR TRAILER FRONT CONSTRUCTION

James J. Black, Cincinnati, Ohio, assignor to The Trailer Company of America, Cincinnati, Ohio, a corporation of Delaware Application May 6, 1938, Serial No. 206,440

8 Claims. (Cl. 296—28)

This invention relates to trailer or truck body frames and is particularly directed to improvements in the structure of the forward end, or nose, of the frame. More specifically, the invention is directed to a prefabricated unitary end section adapted to be secured at the forward end of a frame to provide the desired curved or rounded end.

The conventional frame structure consists essentially of a pair of spaced longitudinal channel irons bridged and secured together by a plurality of transverse frame members which serve also as supports for the longitudinal flooring strips which make up the floor of the trailer or truck body. The assembled frame structure is mounted upon the subframe or chassis of the trailer or truck and forms the foundation upon which the body is built.

It has heretofore been the practice in fabricating the frame to form the rounded end or nose by joining a curved section of the ends of the longitudinal side members, thereby forming a curved continuation of the side members across the front of the frame. This frame structure is considerably wider than the subframe or chassis of the trailer upon which it is mounted. After the frame has been fabricated, the flooring strips are laid over the cross members and fitted to conform to the curved forward edge of the frame as determined by the curvature of the end channel sections.

The fitting and joining operations necessary in assembling the parts in this arrangement are quite difficult and involve skilled and careful workmanship. Moreover, since each unit requires separate treatment, this construction does not lend itself readily to production methods of manufacture. It follows, therefore, that the time and skill entailed in construction results in relatively high fabricating costs.

It has been an object of the present invention to provide a prefabricated forward section or nose plate for trailer frames, formed of a sheet metal stamping susceptible to large scale production methods and adapted to be installed as a unit in a single operation to form the forward extension of the body frame.

It has been another object to provide a one-piece nose plate shaped to determine the proper outline at the forward end of the body and including a side flange. This flange, forming a continuation of the side members of the frame when installed, provides an end structure of increased strength and rigidity.

It has been another object to provide a unitary end section of sheet metal which combines the functions of a frame and a floor section, thereby eliminating the fitting of the flooring over the curved forward area of the body.

Further objects and advantages will be more fully set forth in a description of the drawing illustrating a preferred embodiment of the present invention applied on a trailer frame.

Figure 1 is a top plan view of a trailer body and frame having the nose plate of this invention installed at the forward end thereof.

Figure 2 is a fragmentary side view of the trailer illustrating a portion of the forward end of the trailer in coupled position relative to the rear portion of a tractor.

Figure 3 is a sectional view taken on line 3—3 of Figure 1.

Figure 4 is a sectional view taken on line 4—4 of Figure 1.

Figure 5 is a fragmentary perspective view illustrating the nose plate apart from the trailer frame.

Figure 6 is a sectional view taken on line 6—6, Figure 1.

Referring to the drawing, a trailer body, indicated generally at 10, is mounted upon a frame 11 which rests upon the chassis or subframe 12. The frame 11 consists of a pair of longitudinal side rails 13 preferably of channel iron and a series of transverse members 14 riveted or welded to the longitudinal side members. The members 14, disposed crosswise of the subframe 12, are secured to the subframe 12 and serve to support the body frame. The body frame overhangs the relatively narrow subframe and extends approximately to or beyond the outside line of the wheels 15 of the trailer.

The curved forward end of the frame is formed by the extended nose plate indicated generally at 16. The nose plate or end section comprises a platform or floor section 17 and a side flange 18. The side flange is of channel shaped cross section and approximately corresponds to the cross section of the longitudinal side members 13 of the trailer frame.

In the form illustrated, the forward end of the trailer body is shaped to an irregular curve. The nose plate 16 in this instance is in the form of a semi-elliptic segment with the curved edge of the plate defined by the channel shaped side flange 18. The side flange extends around the curved edge of the plate and terminates at the rear edge of the plate. The rear edges or opposite ends of the side flange are disposed in alignment with and about the forward ends of the longitudinal side members 13 of the frame. The side members are secured to the flange preferably by welding, as at 19 (see Figure 2), and the flange of the nose plate then forms a continuation of the side elements around the front of the trailer body.

The forward portion of the nose plate is supported upon the forward cross member 12a of the subframe or chassis 12 as shown in Figures 3 and 4. In order to position the nose plate upon the forward end of the subframe, the lower horizontal web 20 of the nose plate side flange is notched as at 21. These notches provide clearance for the corners of the end cross member 12a so that the upper web 22 of the nose plate flange can rest upon the opposite forward end corners of the chassis. The upper flange web 22 is secured to the end cross member 12a of the subframe at the points of contact with the corners by a welding or riveting operation. In this manner the nose plate is securely fastened at the forward portion and serves to unite the nose plate and the body frame with the subframe in a rugged unitary structure at the forward end of the trailer.

The rearward or inner edge 23 of the nose plate includes a horizontal flange or lip 24 turned rearwardly from a vertical flange 25 of the nose plate. This flange 24 rests upon the subframe and serves as a support for the forward ends of the flooring strips 25a. The flange is located below the plane of the platform surface of the nose plate a distance substantially equal to the thickness of the flooring strips. The flooring strips 25a are laid over the frame longitudinally and abut the rear edge 23 of the nose plate with the ends of the strips placed upon the flange 24 and supported thereby. The flooring strips then lie flush with the upper surface of the nose plate.

The sheet metal nose plate may be formed by a stamping operation in a die press and can be readily manufactured on a production basis. The installation of the plate to the frame is a relatively simple welding or riveting operation and results in a more rugged structure than has been possible with the frame structure heretofore utilized. This is due to the stiffening influence of the floor section which integrates the side flanges into a solid unit to effectively resist springing or warping of the flanges.

The floor or platform section 17 of the nose plate serves to provide a floor over the forward area of the trailer and additionally as a stiffener for the front section of the trailer body.

The nose plate may be configurated to accommodate any desired body design having a rounded or specially contoured forward end. The type illustrated in the drawings is selected to exemplify one embodiment of the invention although various modifications can be developed without departing from the spirit of the invention. The cross section of the side flange also may be varied to conform to the cross section of the particular longitudinal side members utilized. The invention can be applied to the rear end of the trailer if this is desired, in which case the installation would be substantially the same as at the forward end of the frame.

In the example illustrated, the channeled flange includes the angular step or inset 26 resulting from the vertical flange 25. This further stiffens the flange and provides a space for the reception of the lower edge of the side wall 27 of the trailer body. The raised floor section provided by the stepped portion of the side flange corresponds in thickness to the edge of the flooring applied over the frame.

The wall 27 is supported at the forward end about the nose plate by a series of upright posts 28 which are secured at their lower ends by means of angular brackets 29 attached to the upper face of the plate. The rearward portion or side walls are supported by posts secured to the cross rails and side elements.

As shown in Figure 4, the nose plate may be formed of two sections to permit installation on bodies of various widths. In such cases the plates are divided along a central line, and upon installation, are trimmed to proper size. After trimming, a flange 30 is turned downwardly along the central dividing line and the two halves brought into abutment and welded or riveted together along the flanges 30. In this manner various widths of bodies can be accommodated by a given size platform. This expedient additionally facilitates handling and storage of the parts and permits a number of the sections to be kept on hand and joined to make up the required size as needed.

Having described my invention, I claim:

1. In a trailer or truck body frame, a pair of longitudinal side members, a plurality of cross members, a floor for said frame, a wall for said body secured to said frame, and an end section comprising a sheet metal form including a continuous side flange abutting said longitudinal side members, in alignment therewith, a floor section, and an inset portion about the edge of said end section receiving the lower edge of the wall of said body.

2. A trailer or truck frame comprising side members, cross members connecting said side members, a curved sheet metal end form for said frame, said form including a marginal flange of the same cross section as the side members, said form providing a straight inner edge having a depressed margin forming a cross ledge, and flooring supported on said members and having its ends resting on the ledge, the upper surface of the form being disposed in the same plane as the top of the flooring and, therefore, constituting a continuation of the flooring.

3. A trailer or truck frame comprising, side rails of channel form having offset portions forming ledges, cross members connecting said side rails, an end piece for said frame consisting of sheet metal and including a flanged curved outer edge, the flange being of the same cross section as the side rails and having its ends abutting the ends of the side rails and disposed in alignment therewith, said flange and side rails being secured together.

4. An end piece for a trailer or truck frame comprising, a sheet metal plate, including a curved flanged edge, said edge forming a ledge for supporting a curved forward wall for the trailer or truck, the other edge of said plate being straight and also forming a ledge, said last named ledge affording a support for flooring, and the top of the plate adapted to constitute a continuation of the flooring.

5. In a trailer or truck, a chassis including longitudinal rails, a frame including longitudinal rails and cross rails connecting said longitudinal rails and resting on the chassis rails, an end plate resting on the forward ends of the chassis rails and having a flanged curved forward edge, the ends of which are curved into alignment with the side rails of the frame, and a depending ledge at the inner cross edge of the plate for supporting flooring with the top edge thereof flush with the top of the plate.

6. A trailer or truck frame comprising side members, cross members connecting said side members, a curved sheet metal end form for said frame, said form providing a straight inner edge having a depressed margin forming a cross ledge, and flooring supported on said members and having its ends resting on the ledge, the upper surface of the form being disposed in the same plane as the top of the flooring and, therefore, constituting a continuation of the flooring.

7. A trailer or truck frame comprising, side rails of channel form, cross members connecting said side rails, an end piece for said frame consisting of sheet metal and including a flanged curved outer edge, the flange being of the same cross section as the side rails and having its ends in aligned abutted engagement with the ends of the side rails, said abutted ends being welded together.

8. In a trailer or truck, a chassis including longitudinal rails, a frame including longitudinal rails and cross rails connecting said longitudinal rails and resting on the chassis rails, and an end plate resting on the forward ends of the chassis rails and having a flanged curved forward edge, the ends of which are curved into alignment with the side rails of the frame.

JAMES J. BLACK.